March 11, 1930.  A. R. MASON ET AL  1,750,114
VARIABLE SPEED MECHANISM
Filed June 27, 1928
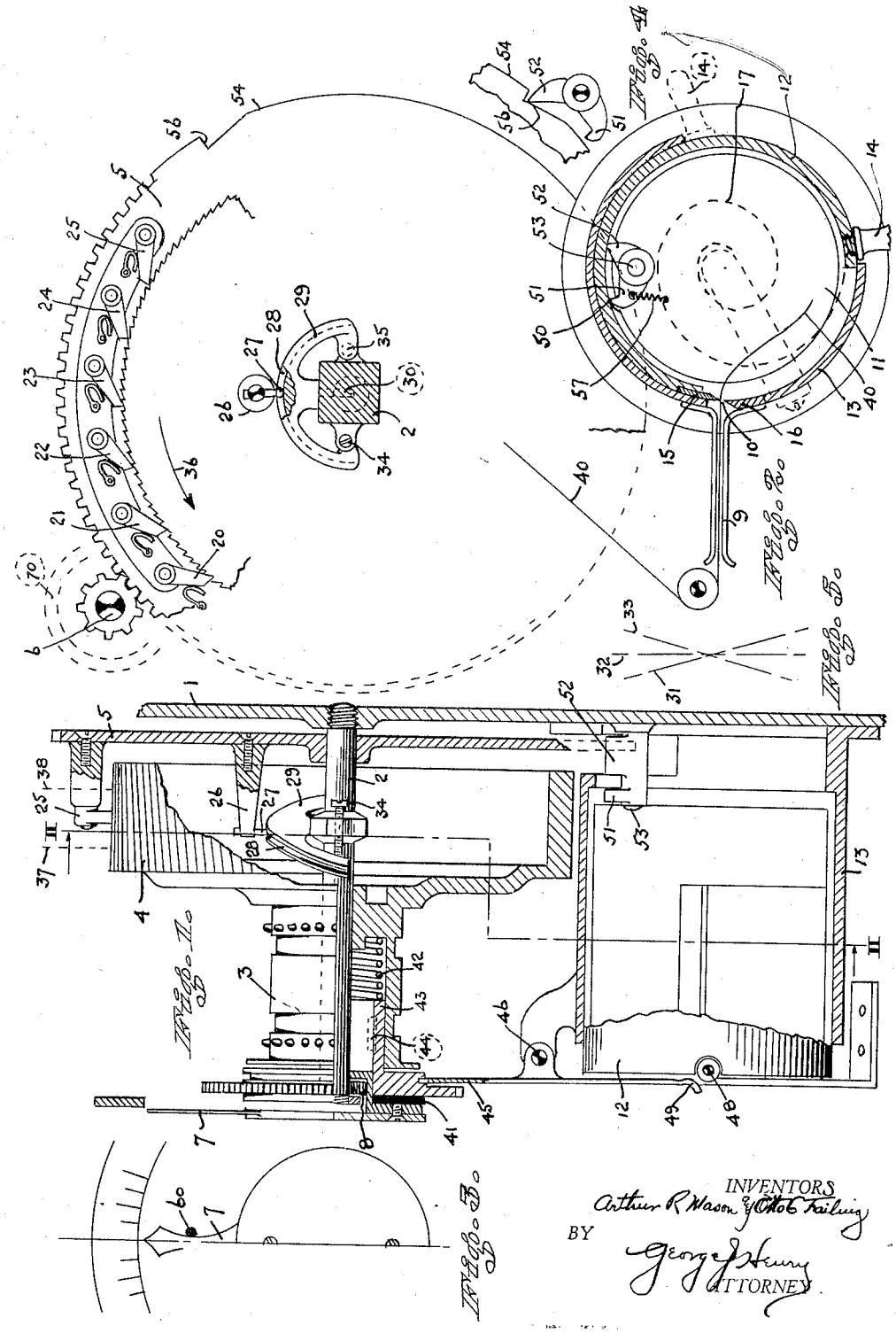
INVENTORS
Arthur R Mason y Otto C Failing
BY George J Henry
ATTORNEY Patented Mar. 11, 1930

1,750,114

UNITED STATES PATENT OFFICE

ARTHUR R. MASON AND OTTO C. FAILING, OF MEDFORD, OREGON, ASSIGNORS TO ACCURATE GASOLINE RECORDING COMPANY, A CORPORATION OF OREGON

VARIABLE-SPEED MECHANISM

Application filed June 27, 1928. Serial No. 288,710.

Our invention has for its object mechanism whereby the relative speeds and therefore the amount of travel of two members may be adjustably varied.

A further object is in mechanism of the character described, a track member adjustable to different angles with respect to the plane of movement of a pair of cooperating members and tracking means associated therewith and adapted to relatively displace the cooperating members with respect to each other.

A further object is a dispensing mechanism, and especially gasoline dispensing mechanism, whereby the rate of movement of the indicating and/or recording means may be accurately proportioned to the displacement of a pump to which our apparatus is attached.

A further object is in apparatus of the character described, means whereby gasoline dispensing mechanism may be standardized as an article of manufacture and when installed with a pump, to be adjustably calibrated to accurately indicate the movements of the pump; and it is therefore adaptable to pumps of varying capacity to which it may be applied.

A further object is a mechanism of the character described in combination with dispensing mechanism delivering a record slip accurately indicating thereon the amount of the commodity dispensed.

Other objects will appear from the drawing and specification which follow:

By referring to the drawing our invention will be made clear.

Fig. 1 is a part section and part elevation through a paper strip feeding machine especially adapted to the dispensing of gasoline and the like with our invention applied thereto.

Fig. 2 is a fragmentary section on the line II—II of Fig. 1.

Fig. 3 is a front view of the indicator and dial.

Fig. 4 is a front detail of the release and locking means.

Fig. 5 is an angle diagram showing adjustable positions for the tracking means.

Throughout the figures similar numerals refer to identical parts.

A base or housing is shown in fragment by the numeral 1 having fixed thereto a spindle 2, on which is rotatively mounted the paper drum 3 and skew toothed ratchet wheel 4.

A rotating member at 5 is adapted to be rotated from a conventional dispensing pump, whose movement initiates and is exactly proportional to the movement of the pinion 6. In the conventional gasoline pump a piston rod is provided with a rack in which a pinion 70 meshes and pinion 70 may be fixed with pinion 6.

The pointer 7 is normally in frictional engagement with the drum 3 and ratchet 4 and therefore indicates the degree of rotation of the drum 3 for any given movement of the pinion 6 and the ratio of the movement of the drum 3 and pinion 6 is adjustably variable by the adjustable tracking means described below.

A coil spring at 8, one end of which is fixed to the spindle 2 and the other to the pointer 7, returns the pointer 7 to zero whenever the friction member 41 between the pointer and the drum 3 is released, as will be explained below.

A conventional paper strip 40, or plurality of strips is advanced by the movement of the drum 3 and is thereafter reeved between the fingers at 9 and shears at 10 to the interior 11 of the rotatable cylinder 12.

The cylinder 12 is free to rotate within the fixed tubular member 13 from the full line position of the handle 14 to its dotted position—see Fig. 2.

The cylinder member 12 carries the knife 15 which shears at 10 against the second and stationary knife at 16 when the handle moves from the full line to the dotted position 14, the cylinder being kept normally in the full line position by the coil spring 17.

When the handle 14 is operated the knife 15 shears any paper strip which has been advanced within the space 11 by the previous movement of the drum 3, and at such time an opening extending from the knife 15 to the handle 14 in the cylinder 12 registers with the opening in the tubular member 13 so that the sheared paper strip within the space 11 may be abstracted therefrom.

The strip may be graduated in any conventional way and will exactly report the movement of the drum 3, and therefore the exact movement of the pinion 6 and of the gasoline pump or other dispensing apparatus.

The movement of the drum 3 originates from the driving member 5 the latter being provided with a plurality of pawls 20, 21, 22, 23, 24, 25 spaced differentially with respect to the skew teeth on the ratchet 4.

The distance between the engaging ends of the pawls 20 and 25 being differentially spaced one-sixth of the pitch of the skew teeth 4.

In other words there will be but one pawl engaging a tooth at any given instant and a movement of one-sixth of the pitch between the teeth will result in the engagement of the next pawl.

By this means we secure a very minute or fractional pick up between the movement of the members 5 and 4.

The member 5 is rotatively and longitudinally movable on the spindle 2 and has extending within the member 4 the post 26 carrying on its end a ball shaped shoe 27, adapted to travel in the track 28 of the arcuate member 29.

The arcuate member is pivotally mounted at 30 to the spindle 2 so that by movement on the said pivot it may be swung into any of the positions of adjustment as 31, 32, 33 see Fig. 5 and may be retained in any position of adjustment as by the adjusting screws 34, 35.

If the arcuate member 29 be set upon the angle 33 there will, during the rotation of the member 5 in the direction of the arrow 36, be a proportional longitudinal movement of the member 5 on the spindle 2 from the right to the left, see Fig. 1; and as the pawls 20 to 25 inclusive are carried upon the member 5 they will travel across the face of the skew teeth 4 substantially from the plane 37 to the plane 38 throughout one full movement in the track 28, or substantially half a revolution of the member 5.

The resulting rotative displacement between the members 4 and 5 will then correspond with the sine of the angle at which the skew teeth are cut and the member 4 will have moved throughout the said stroke at a slower rate than the member 5.

If now the arcuate member 29 be adjusted by the screws 34, 35 by turning about its pivot 30 from the position 33 to the position 31 of Fig. 5 a full stroke in the direction 36 of the member 5 will result in a transverse movement from the plane 38 to the plane 37 of the pawls 20 to 25 inclusive, resulting in an increase of the rate of movement of the member 4 with respect to the member 5 in proportion to the sine of the angle at which the skew teeth are cut.

It will thus be seen that by the adjustment of the arcuate member 29 we are enabled to exactly duplicate or to relatively increase or to decrease the rate of movement of the member 4 with respect to the member 5, and we are thus enabled to adjust the movement of the drum 3 and therefore of the paper strip or strips which it is intended to feed in exact proportion to the stroke and therefore to the volume delivered by the dispensing pump which actuates the pinion 6.

This enables the graduations which may be employed on the paper strip 40 and the movement of the pointer 7 which are identical with the movement of the drum 3, to be adjusted to accurately indicate the movement of the pinion 6 and therefore of any dispensing apparatus on which our invention is employed.

In operation the mechanism will therefore deliver into the space 11, a paper strip accurately indicating the delivery of any dispensing apparatus actuating proportionally the pinion 6.

Plate 41 is forced by the spring 42 acting through the thimble 43 keyed at 44 to the drum 3, into friction engagement with pointer 7 so that pointer 7 is rotated with drum 3 whenever the paper strip 40 is advanced.

A forked lever 45 pivoted at 46 may displace the thimble 43 compressing the spring 42 and releasing the friction plate 41 from the pointer 7 whenever the roller at 48 rides under the end 49 of the forked lever 45, the forked lever at such time being displaced into the dotted position.

The roller 48 is carried upon the cylinder 12 and the latter is provided, on its interior and opposite end, with a notch at 50 within which the pawl 51 engages as best shown in Fig. 2.

The pawl 51 is rigidly fixed with the second pawl 52 pivotally on the fixed pin 53, and pawl 52 rides upon the circular face 54 of the member 5, or when in the zero position, into the notch 56 by the tension spring 57. See Fig. 4.

This double pawl serves as a locking means.

Only at such time as the pawl 52 is in notch 56 will the pawl 51 be withdrawn from the notch 50 in the cylinder 12 and the cylinder thereby released to permit rotation by the handle 14.

It therefore follows that whenever a stroke of the pump pinion 6 is being made and the member 5 has been disturbed from its zero position, pawl 52 riding on the face 50 will retain the pawl 51 locking the cylinder member 12 and the handle may not be rotated.

After any desired pump stroke has been made and returned to its zero position, member 5 will have also returned to its zero position and the notch 56 will release the lock and permit the handle 14 to be operated shearing and delivering an accurate record on the paper slip and completing the record of the dispensing operation.

At the first rotative movement of the cylinder 12 the roller 48 rides under the end 49 compressing the spring 42 and releasing the friction between 41 and pointer 7 and the pointer 7 will therefore return to its zero position against the stop 60, under the action of the spring 8.

The mechanism has now performed one complete operation and is ready for a further pump stroke.

The spring 17 has returned the handle 14 to the full line position of Fig. 2.

At the first further movement of the pinion 6 the pawl 52 rides on the surface 54 locking the cylinder 12 during any further movement of the pinion 6 and retaining it so locked until the member 5 has been returned to the zero position corresponding with the showing in Fig. 4.

The arcuate member 29 is adjusted to any desired angle to calibrate the movement of the drum 3 and pinion 6 and therefore the graduations on the paper 40 with the actual delivery from the dispensing apparatus actuating the pinion 6.

We claim:

1. In speed variable mechanism, a driving element and a driven element, a track member adjustably fixed in a stationary position adjacent to one of said elements, means engaging and adapted to travel under the guidance of said track and fixed to the other of said elements, ratchet skew teeth on one of said elements and pawl means on the other of said elements, whereby when the track member is adjustably displaced then the travel of said first means compels a predetermined relative displacement between the elements.

2. In speed variable mechanism, a driving element and a driven element in axial alignment, a track member adjustably fixed in a stationary position adjacent to one of said elements, means engaging and adapted to travel under the guidance of said track and fixed to the other of said elements, ratchet skew teeth on one of said elements and pawl means on the other of said elements, whereby when the track member is adjustably displaced then the travel of said first means compels a predetermined relative displacement between the elements in an axial direction and a corresponding directly proportional difference of rate of travel of said elements about said axis.

3. In speed variable mechanism, a driving element and a driven element, a track member adjustably fixed in a stationary position adjacent to one of said elements, means engaging and adapted to travel under the guidance of said track and fixed to the other of said elements, ratchet skew teeth on one of said elements and pawl means on the other of said elements, whereby when the track member is adjustably displaced then the travel of said first means compels a predetermined relative displacement between the elements and instrumentalities for adjustably varying the relative position of the track member and engaging means.

4. In speed variable mechanism, a driving element and a driven element, a track member adjustably fixed in a stationary position adjacent to one of said elements, means engaging and adapted to travel under the guidance of said track and fixed to the other of said elements, ratchet skew teeth on one of said elements and pawl means on the other of said elements, whereby when the track member is adjustably displaced then the travel of said first means compels a predetermined relative displacement between the elements and instrumentalities for adjustably varying the relative position of the track member and engaging means in an axial direction and therefore of the elements in an axial direction and a proportional difference in rate of movement about said axis.

ARTHUR R. MASON.
OTTO C. FAILING.